United States Patent
Cole et al.

(10) Patent No.: US 11,846,528 B2
(45) Date of Patent: *Dec. 19, 2023

(54) SYSTEMS AND METHODS FOR IDENTIFYING POINTS OF INTEREST IN PIPES OR DRAIN LINES

(71) Applicant: Ridge Tool Company, Elyria, OH (US)

(72) Inventors: Alex M. Cole, Columbia Station, OH (US); Anthony Greer, Spencer, OH (US); Ryan Lattimer, Avon, OH (US); Christopher Schmauder, Olmsted Falls, OH (US)

(73) Assignee: Ridge Tool Company, Elyria, OH (US)

( * ) Notice: Subject to any disclaimer, the term of this patent is extended or adjusted under 35 U.S.C. 154(b) by 663 days.

This patent is subject to a terminal disclaimer.

(21) Appl. No.: 15/930,652

(22) Filed: May 13, 2020

(65) Prior Publication Data

US 2020/0271478 A1    Aug. 27, 2020

Related U.S. Application Data

(63) Continuation-in-part of application No. 16/206,034, filed on Nov. 30, 2018, now Pat. No. 10,768,017.

(Continued)

(51) Int. Cl.
    *G01B 7/14*      (2006.01)
    *G01D 5/14*      (2006.01)
    (Continued)

(52) U.S. Cl.
    CPC .............. *G01D 5/145* (2013.01); *B08B 9/045* (2013.01); *B08B 9/047* (2013.01); *E03C 1/302* (2013.01); *E03F 2201/40* (2013.01)

(58) Field of Classification Search
    CPC ...... G01D 5/145; B08B 9/043; B08B 9/0433; B08B 9/045; B08B 9/047; B08B 9/0495;
    (Continued)

(56) References Cited

U.S. PATENT DOCUMENTS 5,199,129 A    4/1993   Salecker et al.
6,009,588 A *   1/2000   Rutkowski .............. B08B 9/045
                                             15/104.33

(Continued)

FOREIGN PATENT DOCUMENTS

CN      101782681 A      7/2010
CN      102036759 A      4/2011
(Continued)

OTHER PUBLICATIONS

Examination Report dated Dec. 22, 2021; Application No. DE102018220546.9; 12 pages.

(Continued)

*Primary Examiner* — Thang X Le
(74) *Attorney, Agent, or Firm* — Mark Bandy; Rankin Hill & Clark, LLP

(57) ABSTRACT

Systems and methods for identifying one or more points of interest in pipes or drain lines are described. Examples of points of interest include blockages caused by debris in the pipe or drain line. The systems are incorporated into drain cleaning machines. Also described are drain cleaning machines utilizing the systems.

57 Claims, 11 Drawing Sheets

Related U.S. Application Data

(60) Provisional application No. 62/592,762, filed on Nov. 30, 2017.

(51) Int. Cl.
*B08B 9/047* (2006.01)
*E03C 1/302* (2006.01)
*B08B 9/045* (2006.01)

(58) Field of Classification Search
CPC ....... B08B 9/0497; B08B 9/051; B08B 9/053; B08B 9/055
See application file for complete search history.

(56) References Cited

U.S. PATENT DOCUMENTS

| | | |
|---|---|---|
| 6,243,657 B1 | 6/2001 | Tuck et al. |
| 7,114,578 B2 | 10/2006 | Hutchinson |
| 7,889,980 B2 | 2/2011 | Sooy |
| 7,935,192 B2 * | 5/2011 | Silverman ............... B08B 9/045 |
| | | 15/104.095 |
| 8,046,862 B2 | 11/2011 | Eisermann et al. |
| 8,280,634 B2 | 10/2012 | Young et al. |
| 9,041,794 B1 * | 5/2015 | Olsson .................... G06T 15/04 |
| | | 348/374 |
| 9,534,490 B2 | 1/2017 | Farrag et al. |
| 10,480,171 B2 * | 11/2019 | Miller ...................... E03C 1/302 |
| 10,851,868 B2 * | 12/2020 | Cole ........................ B08B 9/045 |
| 2003/0033879 A1 | 2/2003 | Adewumi et al. |
| 2009/0292502 A1 | 11/2009 | Gress et al. |
| 2010/0125959 A1 | 5/2010 | Sooy |
| 2012/0203501 A1 | 8/2012 | Gress et al. |
| 2013/0160227 A1 * | 6/2013 | Rutkowski ............ B08B 9/0436 |
| | | 15/104.33 |
| 2013/0340836 A1 | 12/2013 | Wambold |
| 2015/0362465 A1 | 12/2015 | Martin et al. |
| 2017/0321402 A1 * | 11/2017 | Thompson .............. E03C 1/302 |
| 2018/0038093 A1 | 2/2018 | Olsson et al. |

FOREIGN PATENT DOCUMENTS

| | | |
|---|---|---|
| CN | 106368289 A | 2/2017 |
| CN | 107199215 A | 9/2017 |
| JP | H0874226 A | 3/1996 |

OTHER PUBLICATIONS

CN Office Action dated Apr. 8, 2020; App No. CN 201811452499.4; 7 pages.

CN Search Report dated Apr. 8, 2020; App No. CN 201811452499.4; 2 pages.

* cited by examiner

SYSTEMS AND METHODS FOR IDENTIFYING POINTS OF INTEREST IN PIPES OR DRAIN LINES

CROSS REFERENCES TO RELATED APPLICATIONS

This application is a continuation-in-part application and claims priority upon U.S. application Ser. No. 16/206,034 filed Nov. 30, 2018, which claims priority upon U.S. provisional application Ser. No. 62/592,762 filed Nov. 30, 2017.

FIELD

The present subject matter relates to drain cleaning systems and methods that detect point(s) of interest and their location(s) in pipes or drain lines.

BACKGROUND

Enclosed regions such as pipes, drains, ducts, enclosures, or other passages, are often difficult to service and inspect due to limited accessibility. Plumbing "snakes" as known in the art, are often employed to locate and clean blockages that can occur in such regions. Snakes can be fitted with different cleaning implements or tools for clearing or removing different types of blockages and impediments from the enclosed region and enable flow therethrough.

Typically, a pipe or drain line will become blocked repeatedly at the same location requiring the same service time after time. In many occasions, a different drain cleaning operator is tasked with clearing the blockage and so may not be aware of the type and/or location of repeated blockage(s). As a result, the operator will typically reclean the entire line. This can increase the time and cost associated with the job, which is undesirable.

Accordingly, a need exists in the drain cleaning and plumbing fields to provide a new system and technique in which information is obtained concerning point(s) of interest and their location(s) within a pipe or drain line. A need also exists for storing or archiving such information for subsequent review or use.

Property owners such as home owners or facility managers such as industrial property or plant managers may also benefit from such information. Thus, a need exists for systems and methods that not only provide such information, but also for generating reports and/or mapped data that detail the point(s) of interest and location(s) of such in pipes or drain lines of the associated home or facility.

SUMMARY

The difficulties and drawbacks associated with previous approaches are addressed in the present subject matter as follows.

In one aspect, the present subject matter provides an identifying system for use with a drain cleaner having an elongated flexible member, a rotatable motor output, and a rotatable cable follower. The identifying system is typically used for identifying a point of interest in an enclosed region and comprises a first sensor assembly including a first pickup associated with the motor output, and a first sensor affixed to a stationary component of the drain cleaner and in operable communication with the first pickup. The system also comprises a second sensor assembly including a second pickup disposed on the cable follower, and a second sensor affixed to a stationary component of the drain cleaner and in operable communication with the second pickup. The system further comprises a counter configured to determine a linear amount of the elongated flexible member dispensed from the drain cleaner. And, the system comprises a controller configured to determine occurrence of a distal end of the elongated flexible member encountering a point of interest in an enclosed region.

In another aspect, the present subject matter provides a drain cleaner comprising a frame assembly and a motor having a rotatable motor output. The motor is supported by the frame assembly. The drain cleaner also comprises a rotatable drum supported by the frame assembly. The drum at least partially houses an elongated flexible member. The drain cleaner also comprises a rotatable cable follower that rotates upon linear displacement of the flexible member. The drain cleaner further comprises a first sensor assembly including a first pickup associated with the motor output, and a first sensor affixed to a stationary component of the drain cleaner and in operable communication with the first pickup. The drain cleaner also comprises a second sensor assembly including a second pickup disposed on the cable follower, and a second sensor affixed to a stationary component of the drain cleaner and in operable communication with the second pickup. And, the drain cleaner also comprises a counter configured to determine a linear amount of the elongated flexible member dispensed from the drain cleaner.

In yet another aspect, the present subject matter also provides an identifying system for use with a drain cleaner having an elongated flexible member, a rotatable motor output, and a rotatable cable follower. The identifying system is typically used for identifying a point of interest in an enclosed region and comprises a first sensor assembly including a first pickup disposed on the motor output, and a first sensor affixed to a stationary component of the drain cleaner and in operable communication with the first pickup. The motor output is one or more of a rotatable drive shaft of a motor and/or one or more rotatable components powered or driven by the motor. The identifying system also comprises a second sensor assembly including a second pickup disposed on the cable follower, and a second sensor affixed to a stationary component of the drain cleaner and in operable communication with the second pickup. The identifying system further comprises a counter configured to determine a linear amount of the elongated flexible member dispensed from the drain cleaner. And, the identifying system also comprises a controller configured to determine occurrence of a distal end of the elongated flexible member encountering a point of interest in an enclosed region.

In yet another aspect, the present subject matter provides a drain cleaner comprising a frame assembly and a motor having a rotatable motor output. The motor is supported by the frame assembly. The drain cleaner also comprises a rotatable drum supported by the frame assembly. The drum at least partially houses an elongated flexible member. The drain cleaner also comprises a rotatable cable follower that rotates upon linear displacement of the flexible member. The drain cleaner further comprises a first sensor assembly including a first pickup disposed on the motor output, and a first sensor affixed to a stationary component of the drain cleaner and in operable communication with the first pickup. The motor output is one or more of a rotatable drive shaft of a motor and/or one or more rotatable components powered or driven by the motor. The drain cleaner also comprises a second sensor assembly including a second pickup disposed on the cable follower, and a second sensor affixed to a stationary component of the drain cleaner and in operable communication with the second pickup. And, the drain cleaner additionally comprises a counter configured to determine a linear amount of the elongated flexible member dispensed from the drain cleaner.

In still a further aspect, the present subject matter provides an identifying system for use with a drain cleaner having an elongated flexible member, a rotatable motor output, and a rotatable cable follower. The identifying system is typically used for identifying a point of interest in an enclosed region and comprises a first sensor assembly providing a rate of rotation of the motor output. The system also comprises a second sensor assembly including a pickup disposed on the cable follower, and a sensor affixed to a stationary component of the drain cleaner and in operable communication with the pickup. The system further comprises a counter configured to determine a linear amount of the elongated flexible member dispensed from the drain cleaner. And, the system comprises a controller configured to determine occurrence of a distal end of the elongated flexible member encountering a point of interest in an enclosed region.

In yet another aspect, the present subject matter provides a drain cleaner comprising a frame assembly and a motor having a rotatable motor output. The motor is supported by the frame assembly. The drain cleaner also comprises a rotatable drum supported by the frame assembly. The drum at least partially houses an elongated flexible member. The drain cleaner also comprises a rotatable cable follower that rotates upon linear displacement of the flexible member. The drain cleaner additionally comprises a first sensor assembly providing a rate of rotation of the motor output. The drain cleaner further comprises a second sensor assembly including a pickup disposed on the cable follower, and a sensor affixed to a stationary component of the drain cleaner and in operable communication with the pickup. And, the drain cleaner also comprises a counter configured to determine a linear amount of the elongated flexible member dispensed from the drain cleaner.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
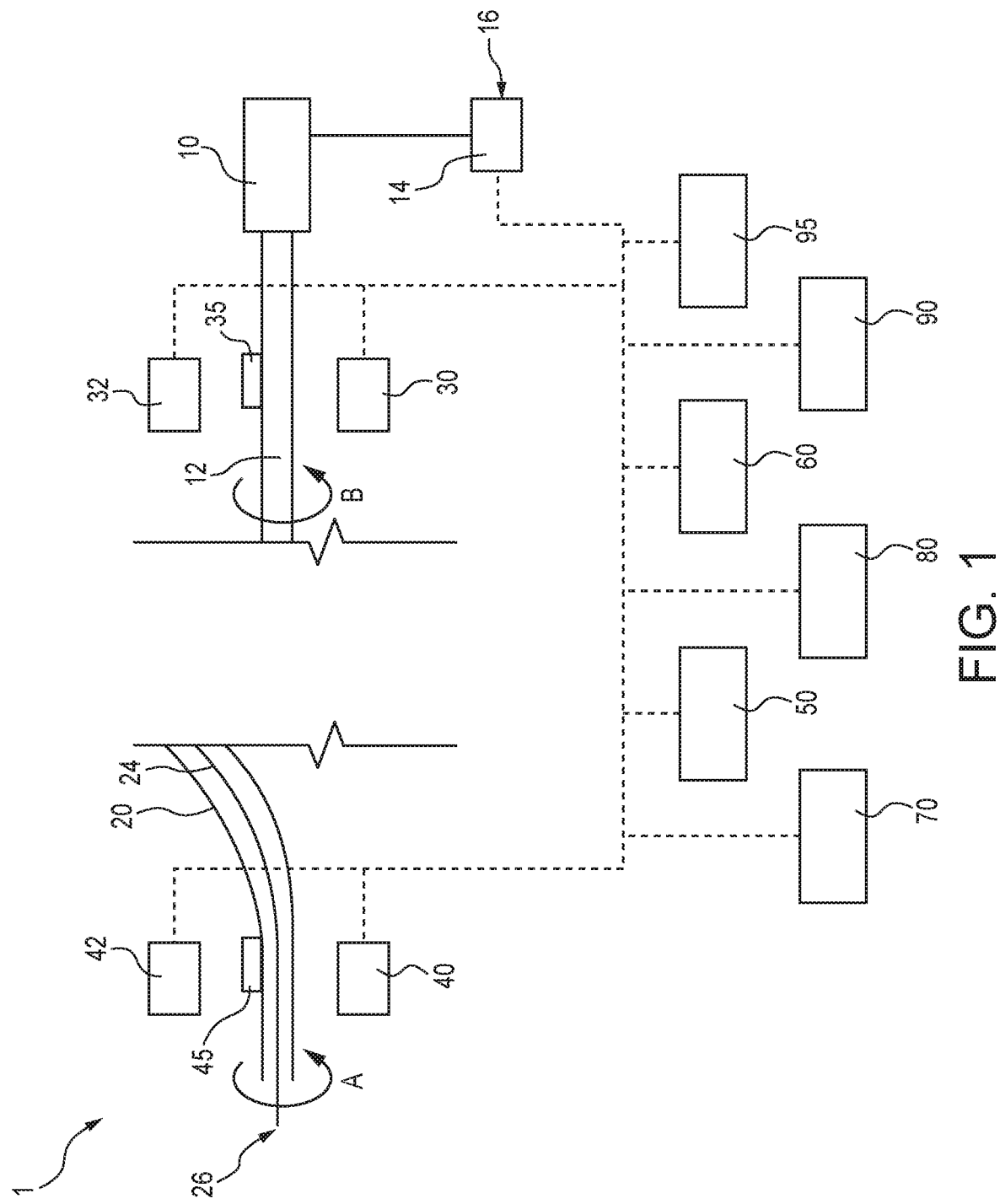
FIG. 1 is a schematic diagram of an embodiment of an identifying system in accordance with the present subject matter.

The present subject matter provides identifying systems and related methods for identifying point(s) of interest and their location(s) in pipes, drain lines, or other enclosed regions. Generally, the present subject matter provides identifying systems for use with or incorporation in, drain cleaning machines. The systems typically comprise a first sensor assembly for monitoring rotation of a motor in the drain cleaner. The first sensor assembly includes a pickup associated with the motor output and one or more sensors that are in operable communication with the motor pickup. The motor output can include one or more of a rotatable drive shaft of the motor, and/or one or more rotatable components powered or driven by the motor. The systems also comprise a second sensor assembly for monitoring rotation of a cable follower or like component in the drain cleaner. The second sensor assembly includes a pickup associated with the cable follower and one or more sensors that are in operable communication with the cable follower pickup. The systems additionally comprise a counter or similar component in communication with the first and second sensor assemblies. In many embodiments, the counter is incorporated or included in the controller. In such configurations, the controller performs calculations and processing and computes the linear distance along with gathering the data for the point of interest evaluation. The counter is configured to determine a linear amount of cable, snake, or other flexible member dispensed or advanced from the drain cleaner. The systems also comprise a controller or like component, in communication with the counter or the counter and sensor assemblies. The controller is configured to determine occurrence of the distal end of the cable encountering a point of interest in the enclosed region.

The term "point of interest" as used herein refers to one or more items at a location in an enclosed region which is of interest to one or more individuals. Thus, the term point of interest can refer to one or more items in the enclosed region, and/or portions of pipes, drain lines, or associated components at a specific location within the enclosed region giving rise to the point of interest. Typically, a point of interest refers to a clog, bend, turn, obstruction, presence of foreign matter or debris, and/or other trouble spots within the enclosed region. And the term "enclosed region" as used herein refers to an interior volume within one or more objects which is typically relatively long in linear span and which has limited accessibility. Nonlimiting examples of enclosed regions include pipes or pipelines, drains or drainlines, ducts, conduit, air passageways, and hollow bores or shafts.

Before addressing details and additional aspects of the systems and methods of the present subject matter, description is provided of the drain cleaning machines or drain cleaners with which the noted systems and methods are used. Although a wide array of drain cleaning machines can be used, typically such machines are "drum type" drain cleaners as known in the art. Typically, such drain cleaners include a cable container or drum in which is stored a flexible elongated cable or snake as known in the art, an electric motor which upon actuation, rotates the cable container, and a rotatable cable follower which rotates as cable is dispensed from, or retracted into, the cable container. Drum-type drain cleaner machines are available commercially from various suppliers including the present assignee. Nonlimiting examples of such commercially available drum-type drain cleaners include models K-7500, K-6200, K-400, and K-750, all available from Ridge Tool Company. Drum-type drain cleaners are described in a variety of patents such as U.S. Pat. No. 2,468,490 to DiJoseph; U.S. Pat. No. 2,730,740 to O'Brien; U.S. Pat. No. 3,007,186 to Olsson; U.S. Pat. No. 3,394,422 to Siegal; U.S. Pat. No. 3,095,592 to Hunt; U.S. Pat. No. 3,134,119 to Criscuolo; U.S. Pat. No. 3,246,354 to Cooney, et al.; U.S. Pat. No. 4,364,139 to Babb, et al.; U.S. Pat. No. 4,580,306 to Irwin; U.S. Pat. No. 5,031,276 to Babb, et al.; U.S. Pat. No. 7,889,980 to Sooy; U.S. Pat. No. 8,176,593 to Gress; and, U.S. Pat. No. 6,009,588 to Rutkowski, all of which are hereby incorporated by reference.

In one embodiment of the present subject matter, the identifying system comprises two back biased hall sensors that each include two internal sensors which determine the number of teeth of a metallic pickup that pass the sensors and the direction in which the teeth pass relative to the sensor. One sensor and pickup are associated with the output shaft of a motor which is directly coupled to a cable container such as a drum of a drain cleaner. The second sensor and pickup are associated with the cable follower. Each pickup is mounted to a rotating member whereas each sensor is mounted to a fixed component. During use, both the cable container and cable follower rotate at the same speed. As cable is removed from the cable container, the cable follower rotates faster relative to the cable container. As cable is returned to the cable container, the cable follower rotates slower relative to the cable container. These aspects are described in U.S. Pat. No. 8,046,862. However, the use of a single, multi-sensor, back biased hall sensor; or two, single-sensor, back biased hall sensors mounted in relation to the pickups make it possible to identify direction. Identifying direction is beneficial for using the machine without powering the motor or if the motor is run in reverse.

In certain embodiments, detection of one or more point(s) of interest is achieved by measuring the rotational speed of a metallic pickup and particularly the pickup associated with the motor. As the front or distal end of the cable, typically having a tool affixed thereto, encounters a point of interest and causes a slowing of the axial and/or rotational speed of the distal cable end, the slowing distal end creates a resistance torque to the machine. This resistance torque is translated into a slowing of the motor RPM, particularly if the motor is a universal motor. Typically, as the cleaning head encounters a bend, the head can become stuck in the trap or bend as a result of the head catching on fittings or other items. Likewise, as the cable bends around a corner, additional load and friction is created and thereby slowing down the free load RPM. The load applied at the cleaning head is transmitted through the cable and into the drum. The load, now greater than the free spinning load, causes universal motors to slow their rotational speed.

Upon startup, a data acquisition unit or counter as noted herein begins collecting RPM data from the sensors and continues collecting data throughout the entire run. In many embodiments, the acquisition unit does not perform the actual determination of point(s) of interest but in turn provides and saves the data for transmitting to a controller or processor of a connected device such as a mobile device or smart phone for example. The connected device normalizes the data so that false positives are not projected to the user and only points of interest are identified based on predetermined slope thresholds. Points of interest can include difficult bends, soft blockages, and hard blockages for example. Additional details of these aspects and others are provided herein.

Detection of one or more point(s) of interest can also be performed by measuring or monitoring electrical current the motor draws from its power source. As the torque increases as noted above, the load on the motor also increases and therefore the motor requires more current to produce the same power. As a result, the current can be measured so as to indicate the same point(s) of interest and slope patterns as described above. However, these slopes will be approximately inverse to the slopes generated from RPM data in which the current starts relatively small and increases as the cable distal end encounters point(s) of interest.

FIG. 1 schematically illustrates an embodiment of an identifying system in accordance with the present subject matter. The system 1 is typically incorporated or at least partially incorporated, in a drain cleaner having a frame assembly, an elongated flexible member, cable, or snake 24 with a distal end 26, a motor 10 providing a rotary motor output 12, and a rotatable cable follower 20 through which the cable 24 extends. As will be understood by those familiar with drain cleaning machines, powered rotation of the motor output, such as in the direction of arrow B in FIG. 1, causes rotation of a cable container which is typically in the form of a drum. Rotation of the cable container results in dispensing or withdrawing of the cable 24. Axial force on the cable 24 results in the dispensing or withdrawing of the cable and likewise results in the relative rotational displacement of the cable follower 20 to the cable container. Such axial movement of the cable 24 results in rotation of the cable follower 20, such as in the direction of arrow A in FIG. 1. The system 1 comprises a first sensor assembly including a first pickup 35 disposed on the motor output 12, and a first sensor 30 affixed to a stationary component of the drain cleaner and in operable communication with the first pickup 35. The system 1 also comprises a second sensor assembly including a second pickup 45 disposed on the cable follower 20, and a second sensor 40 affixed to a stationary component of the drain cleaner and in operable communication with the second pickup 45. The system 1 also comprises a counter 50 configured to determine a linear amount of the elongated flexible member 24 dispensed from the drain cleaner. The system 1 additionally comprises a controller 60 configured to determine occurrence of an encounter between the distal end 26 of the member 24 and a point of interest in the enclosed region. The controller is typically hardware and/or software that perform computing, monitoring, and/or processing functions. In many embodiments, the controller includes one or more processor(s) and associated memory and can be included in the electronics of the system. In certain embodiments, all point of interest identification is handled on a secondary device in wireless communication with the controller. However, the present subject matter also includes a configuration in which the point of interest identification is compiled or performed on the system or drain cleaner. Data storage can be performed using flash memory devices for example.

In certain embodiments, the system 1 may also comprise one or more secondary sensors. For example, with further reference to FIG. 1, the system 1 may also comprise a secondary sensor 32 in operable communication with the pickup 35 on the motor output 12. And, the system 1 may also comprise a secondary sensor 42 in operable communication with the pickup 45 on the cable follower 20. For versions of the system utilizing a single sensor such as sensor 30 and/or sensor 40, a single, multi-sensor, back biased hall sensor can be used for each of sensors 30 and 40. Such hall sensors typically include two internal sensors. For versions of the system utilizing a pair of sensors such as sensors 30, 32, and/or sensors 40, 42, two single-sensor, back biased hall sensors can be used for each pair of sensors. For versions of the system utilizing a pair of sensors 30, 32, and/or sensors 40, 42, the sensors are typically not placed at exactly 180 degrees from each other. However, the present subject matter includes systems in which sensors of a pair are located 180 degrees from each other.

In particular versions, the system 1 may also comprise a current sensor 14 configured to determine electrical current draw of the motor 10 of the drain cleaner from a power source 16.

In another version, the system 1 may also comprise a pickup 35 and/or 45 with unequal teeth spacing biased in one rotational direction and only one sensor 30 and/or 40.

The counter 50 and/or the controller 60 of the identifying system 1 are typically in the form of electronic or digital provisions in one or more processors or control units of the drain cleaner and/or other devices. The counter is typically configured to calculate linear footage. The counter 50 and/or the controller 60 of the identifying system 1 can also be provided in processors or control units which are remote from the drain cleaner, such as in a mobile device, smart phone, tablet, and/or in a computer or other processor separate from the drain cleaner. The counter 50 is in data communication with the sensors 30, 40 and optionally with the secondary sensors 32, 42. The counter 50 is configured to measure and/or monitor the number of rotations of pickups 35, 45. More specifically, in certain versions, the counter 50 is configured to measure and/or monitor the number of individual teeth that pass the sensor. The controller 60 is in data communication with the counter 50 and may also be in data communication with one or more of the sensors 30, 32, 40, and/or 42. In certain versions, the counter and controller can be combined and/or integrated in a single component such as for example a digital processor. In one embodiment, the counter 50 is provided by processors or control units onboard the drain cleaner, and the controller 60 is provided by processors or control units onboard a mobile device. In certain versions, the controller is the main electrical assembly which computes distance, records data, and sets machine parameters. The counter should just be the displayed output of distance from the controller.

Communication between the drain cleaner and the mobile device can be provided by a wide array of wireless technologies such as by Wi-Fi and Bluetooth. Alternatively, communication can be by cabling or other means. However, the present subject matter also includes embodiments in which both the counter 50 and the controller 60 are provided by processors or control units onboard the drain cleaner. And, the subject matter includes embodiments in which both the counter 50 and the controller 60 are provided by processors or control units onboard a mobile device. Communication with one or more of the sensors 30, 32, 40, and/or 42 can occur via Wi-Fi or Bluetooth, or using other technologies.

The identifying system 1 may also provide or be configured to provide one or more monitors or displays 70, archival or data storage provisions 80, and/or supervisory or additional computing provisions 90. One or more monitors or displays 70 can be provided onboard the drain cleaner or be remote such as incorporated in a mobile device 95 for example. The archival or data storage provisions 80 can also be provided onboard the drain cleaner or remote therefrom. Nonlimiting examples of archival or data storage provisions 80 include electronic data memory and/or writable media such as portable drives and disks. The computing provisions 90 can also be provided onboard the drain cleaner or remote therefrom. Nonlimiting examples of computing provisions 90 include supervisory computing stations, monitoring stations, and/or registration stations. The computing provisions 90 can also be provided via the mobile device(s) 95. Cloud-based communications can be used for communication between any of the components of the system.

In many versions of the present subject matter, the systems use cloud-based storage and/or cloud-based processing and thus can be accessed and implemented in a distributed fashion using remotely located servers or other computers. Typically such servers, computers or other devices are accessed via the internet.

Cloud-based storage and/or processing refers to online storage and/or processing by which data is virtually stored and/or processed across one or multiple servers, which are typically hosted by service providers. The term "cloud-based computing" refers to one or more of cloud-based data storage, cloud-based data processing, and/or cloud-based data communication. The service providers may include data center operators, which virtualize resources based on customer requirements. The storage services may be accessed via web service application programming interfaces (API) or via web-based user interfaces (UI). Cloud-based computing is described in the prior art such as for example in WO 2013/141868; US 2012/0060165; WO 2013/119247; and US 2011/0153868.

Figure 2:
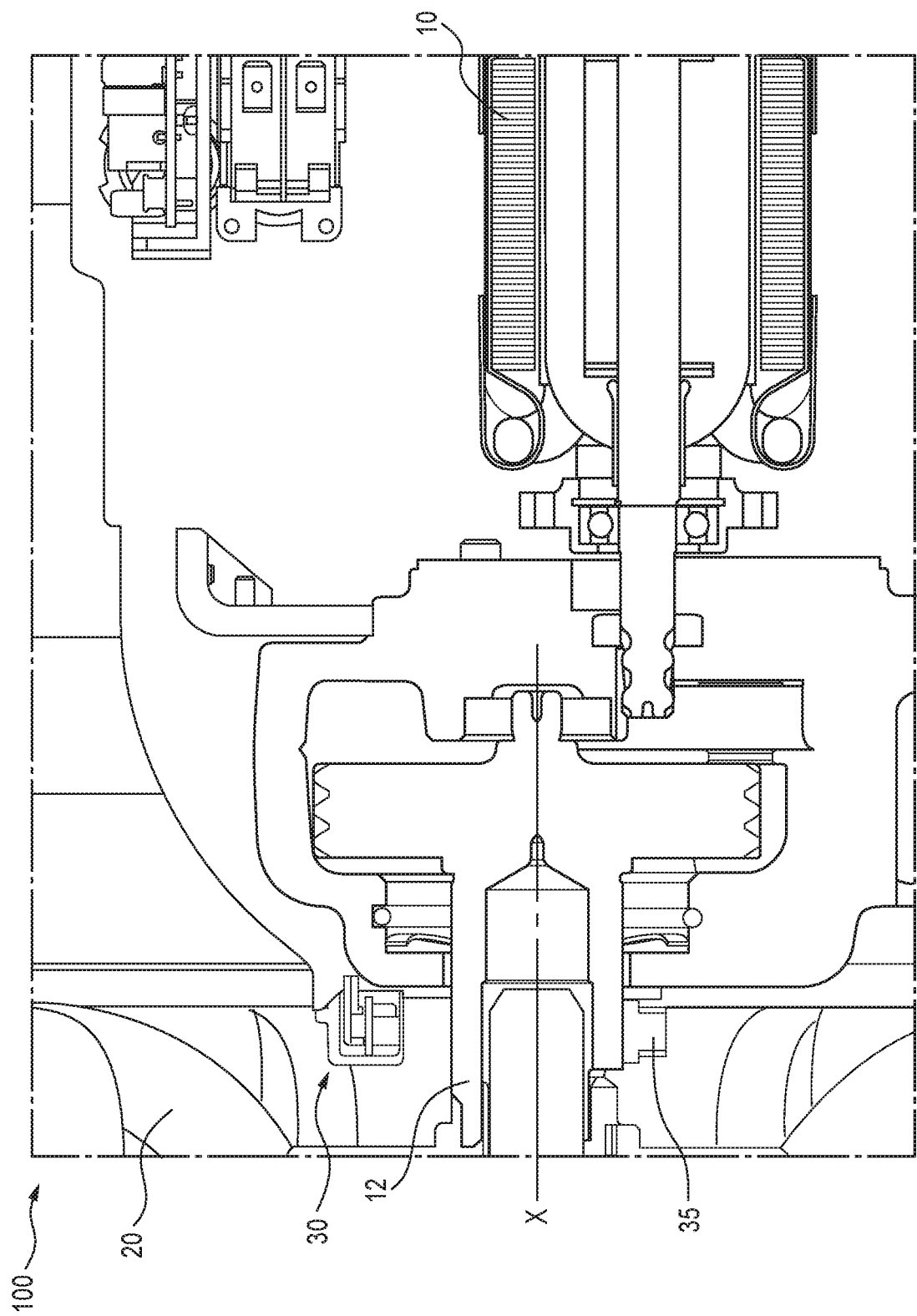
FIG. 2 is a schematic, partial cross sectional view of a portion of a drain cleaner equipped with an embodiment of an identifying system in accordance with the present subject matter.

FIG. 2 schematically illustrates a partial cross section of a drain cleaning machine 100 having a motor 10 which rotatably drives or powers a rotatable output 12. The drain cleaning machine 100 also includes a cable follower 20. A first sensor assembly is shown that includes a first pickup 35 disposed on the output 12, and a first sensor 30 affixed to a stationary component of the drain cleaner. The first sensor 30 is in operable communication with the first pickup 35. Upon activation of the motor 10, the output 12 is rotated about its axis of rotation X. Similarly, upon rotation of the output 12, the pickup 35 passes the stationary sensor 30.

Figure 3:
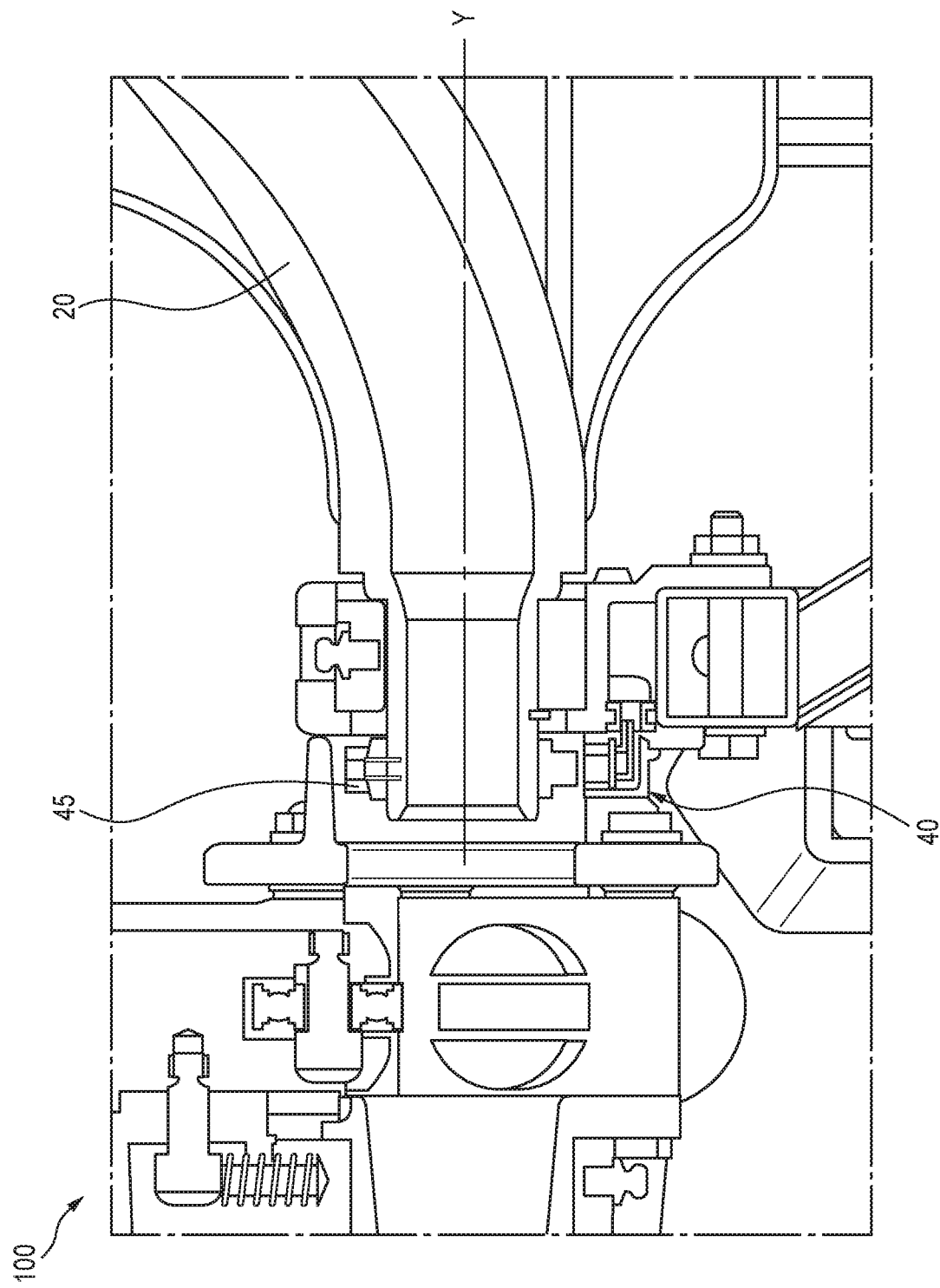
FIG. 3 is a schematic, partial cross sectional view of another portion of the drain cleaner of FIG. 2 equipped with the identifying system in accordance with the present subject matter.

FIG. 3 schematically illustrates another partial cross section of the drain cleaning machine 100 depicted in FIG. 2. FIG. 3 shows the cable follower 20 and its axis of rotation Y. A second sensor assembly is shown that includes a second pickup 45 disposed on the cable follower 20, and a second sensor 40 affixed to a stationary component of the drain cleaning machine 100. The sensor 40 is in operable communication with the pickup 45. Upon activation of the motor 10 (shown in FIG. 2) and dispensing or withdrawal of cable (not shown) relative to the machine, the cable follower 20 rotates about axis Y. Similarly, upon rotation of the cable follower 20, the pickup 45 passes the stationary sensor 40.

Figure 4:
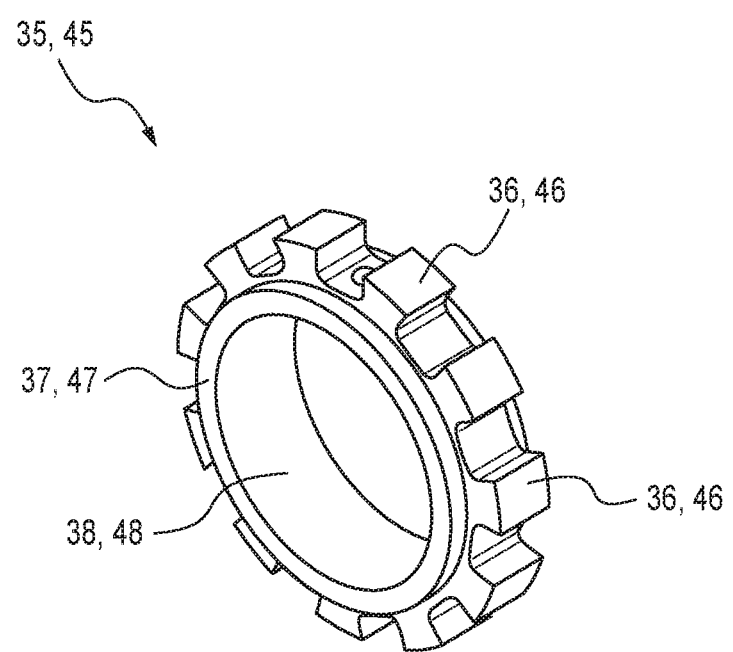
FIG. 4 is a schematic perspective view of an embodiment of a pickup component of the identifying system in accordance with the present subject matter.

FIG. 4 depicts a representative pickup such as previously described pickups 35, 45. In this version, the pickup 35 or 45 is in the form of a circular, metallic ring having a body 37, 47 and a plurality of projections or teeth 36, 46 extending radially outward from the body 37, 47. An interior circumferential face 38, 48 is directed toward, and may contact, the motor output 12 or cable follower 20 upon which the pickup 35, 45 is mounted or affixed. In many versions, the ring and teeth are formed from or include a ferrous material.

A wide array of sensor types can be used for the sensors 30, 32, 40, and/or 42. In many versions of the present subject matter, the sensors or sensor assemblies are non-contact type sensors and thus no contact occurs between the sensor(s) and a corresponding pickup. The previously described sensors 30, 32, 40, and 42 are non-contact sensors. As previously noted, in many embodiments a hall sensor (or hall effect sensor) is used. A hall sensor is a transducer that varies its output voltage in response to a magnetic field. Hall sensors are available with either linear or digital outputs. Linear sensors give a continuous voltage output that increases with a strong magnetic field and decreases with a weak magnetic field. In linear output hall effect sensors, as the strength of the magnetic field increases, the output signal from the amplifier will also increase until it begins to saturate by the limits imposed on it by the power supply. Any additional increase in the magnetic field will have no effect on the output but drive it more into saturation.

Digital output hall sensors have a Schmitt-trigger with built-in hysteresis connected to an amplifier. When the magnetic flux passing through the hall sensor exceeds a pre-set value, the output from the device switches quickly between its "OFF" condition to an "ON" condition without any type of contact bounce. This built-in hysteresis eliminates any oscillation of the output signal as the sensor moves in and out of the magnetic field. Thus digital output hall sensors have two states, "ON" and "OFF."

There are two basic types of digital hall effect sensor, bipolar and unipolar. Bipolar sensors require a positive magnetic field (south pole) to operate them and a negative field (north pole) to release them. In contrast, unipolar sensors require only a single magnetic south pole to both operate and release them as they move in and out of the magnetic field.

The present subject matter system may optionally comprise one or more mobile electronic devices. The mobile devices can be in a variety of forms such as smartphones, tablet computers, or laptop computers for example. More particularly, the mobile device includes a computing device that may be a small-form factor portable (or mobile) electronic device such as a mobile phone or smartphone, or, alternatively, a personal data assistant (PDA), a personal media player device, an application specific device such as a tablet or slate computing device, or a hybrid device that may include any of the above functions. Nonlimiting examples of smartphones include devices running on ANDROID or IPHONE, e.g., iOS, platforms. Nonlimiting examples of tablet computing devices include IPAD available from Apple Corporation. Nonlimiting examples of a personal media player device is an IPOD or more particularly an IPOD TOUCH available from Apple. The mobile device may also be in the form of a personal computer including both laptop computer and non-laptop, e.g., desktop, computer configurations.

The mobile devices include electronic data storage provisions, control provisions, communication provisions, and user interface provisions. The data storage provisions of the mobile devices enable information relating to machine use, user information, and data and/or permissions from the registration and control component to be stored and/or accessed at the mobile device. The data storage provisions can be in the form of known data storage formats such as flash memory components. The data storage provisions may also include or be in the form of memory cards, disk or drive components, data cartridges or components such as ROM or RAM memory, and peripheral data storage components.

The control provisions of the mobile devices typically include electronic circuitry and generally in the form of one or more processors. In many embodiments, the mobile devices control data and/or information exchange or transmission with one or more drain cleaning machines registered with the system. As previously described, the mobile devices relay activation signal(s) issued from the registration and control component to the machine(s).

The mobile devices also include communication provisions between the mobile device and one or more drain cleaning machines; and optionally between the mobile device and a supervisory computer or other component. Communication between the mobile device and the drain cleaning machines can be established or provided using one or more communication formats such as radio frequency (RF), infrared (IR), and/or BLUETOOTH as known in the art. In particular embodiments, communication is by a wireless local area network (WLAN), i.e., Wi-Fi. The present subject matter also includes the use of other types of communication such as near-field communications (NFC). A nonlimiting list of other potentially suitable wireless protocols for communication between the mobile device and tool(s) of interest include ZIGBEE, GLOWPAN, Wireless HART, ISA 100, WiMi, SimpliciTI, KNX, EnOcean, Dash7, WISA, ANT, ANT+, WiMax, ONE-NET, Z-Wave, Insteon, and RuBee. In certain embodiments, communication between the mobile device and machine(s) can also be established by cables or other hardwired connections.

Mobile devices may be communicatively coupled to cloud-based service and data centers and/or a third party entity via, e.g., at least a wireless local area network technology (WLAN), i.e., Wi-Fi. However, embodiments of local access to cloud-based storage are not limited to wireless communications, and therefore hard-wired communications may also apply to the embodiments described herein.

The mobile devices also include communication provisions between the mobile device and if used, the supervisory computer or other component. Typically, such communications are via the internet, and utilize a cloud-based infrastructure. However, the present subject matter also includes the use of other communications between the mobile devices and the computer and/or the other control component.

The mobile devices also include one or more user interface provisions. In a particular embodiment of the present subject matter, the mobile device is in the form of a smartphone or portable electronic computer for example an IPAD. The mobile device may also include a keyboard which can be virtual or provided as a physical input device incorporated in the mobile device or separate therefrom but connectable thereto. Other input components can be used such as mouses, track balls, and joysticks for example. The mobile device typically also includes a display or other information output so that information can be displayed for viewing by a user. Again, the display is typically incorporated within the mobile device, but the present subject matter includes the use of separate but connectable displays.

As previously noted, the mobile devices also include electronic data storage provisions and control provisions. In many embodiments of the present subject matter, the mobile device is configured to run or execute an algorithm, application, or "app" as known in the art which facilitates communication with the primary computer or other component and/or the drain cleaner. Apps, their transfer or download, and running and maintenance thereof are described in the prior art such as for example in U.S. Pat. No. 8,549,656;

US 2013/0122861; WO 2013/163249; and WO 2012/155937. The algorithm or app may also facilitate administration of permissions from the registration and control component, transmission of data or information between the computer and/or other component and the mobile device, and/or the mobile device and the drain cleaner of interest. The algorithm or app may additionally facilitate user access, use of one or more drain cleaner(s) of interest, and/or provide indications and/or warnings to a user concerning the system.

The present subject matter also provides various methods relating to identifying one or more point(s) of interest in an enclosed region such as pipes or drain lines. In many embodiments, the methods utilize the identifying systems described herein. However, it will be appreciated that the present subject matter includes methods utilizing other systems or variants of the identifying systems described herein. In one embodiment, a sensor, such as sensor 40 is affixed to a stationary component while a pickup such as pickup 45, is affixed to a rotatable member which can be either the cable carrier 20 or the motor output 12. Upon startup of the drain cleaning machine, the RPM of the rotatable member will begin at zero and increase until it reaches a stability point. The stability point can change depending on the type of motor that is used and the temperature of the machine. Typically, this value, i.e., the RPM stability point, can range between 200 RPM and 315 RPM. However, the stability value can fall outside of these values for different drain cleaning machines.

In one embodiment, the method to identify point(s) of interest is performed by first measuring the RPM of the rotatable member and outputting the measured data at a predetermined set of time intervals. The output values are then averaged over a time interval such as a three second interval to create a second set of data that has been smoothed to avoid fallacies in reporting. As the data is collected and processed, a predetermined slope value is compared a calculated slope value determined from the smoothed data. The comparison is performed to identify a specific rate of change in the RPM of the rotatable member which is characteristic of a point of interest. In a particular embodiment, the predetermined slope value is created by first measuring inputs from known sources (blends, blockages, etc.) in the form of current or RPM. Then comparing those graphical representations to determine a slope range for each instance.

As seen from the representative raw data and the averaged smoothed data in Table 1, it is evident how fluctuations in the raw data could create false positives. Once the calculated slope value is matched or otherwise assessed to be sufficiently close to the predetermined slope value, a point of interest is identified for the corresponding length of cable currently dispensed from the machine, thus allowing the user to identify the location of possible bends or blockages in the enclosed region.

TABLE 1

Representative Raw RPM Data and Averaged or "Smoothed" Data

| Measured RPM | Averaged or "Smoothed" RPM |
|---|---|
| 0 | |
| 10.7 | |
| 86.93 | |
| 149.73 | |
| 184.72 | |
| 204.01 | |
| 206.45 | |

TABLE 1-continued

Representative Raw RPM Data and Averaged or "Smoothed" Data

| Measured RPM | Averaged or "Smoothed" RPM |
|---|---|
| 236.22 | |
| 228.18 | |
| 245.99 | |
| 249.91 | |
| 258.71 | |
| 260.78 | |
| 268.43 | |
| | 190.1027 |
| 260.78 | |
| | 207.998 |
| 268.43 | |
| | 225.394 |
| 271.64 | |
| | 238.21 |
| 279.17 | |
| | 247.062 |
| 282.51 | |
| | 253.2853 |
| 278.07 | |
| | 258.5187 |
| 282.51 | |
| | 263.2933 |
| 278.07 | |
| | 266.3793 |
| 282.51 | |
| | 270.5707 |
| 291.05 | |
| | 273.7293 |
| 293.37 | |
| | 275.68 |
| 279.17 | |
| | 277.9907 |
| 293.37 | |
| | 279.8567 |
| 288.77 | |
| | 281.5193 |
| 293.37 | |
| | 283.4613 |
| 289.91 | |
| | 285.124 |
| 293.37 | |
| | 286.342 |
| 289.91 | |
| | 287.2887 |
| 293.37 | |
| | 287.706 |
| 288.77 | |
| | 288.726 |
| 293.37 | |

Figure 5:
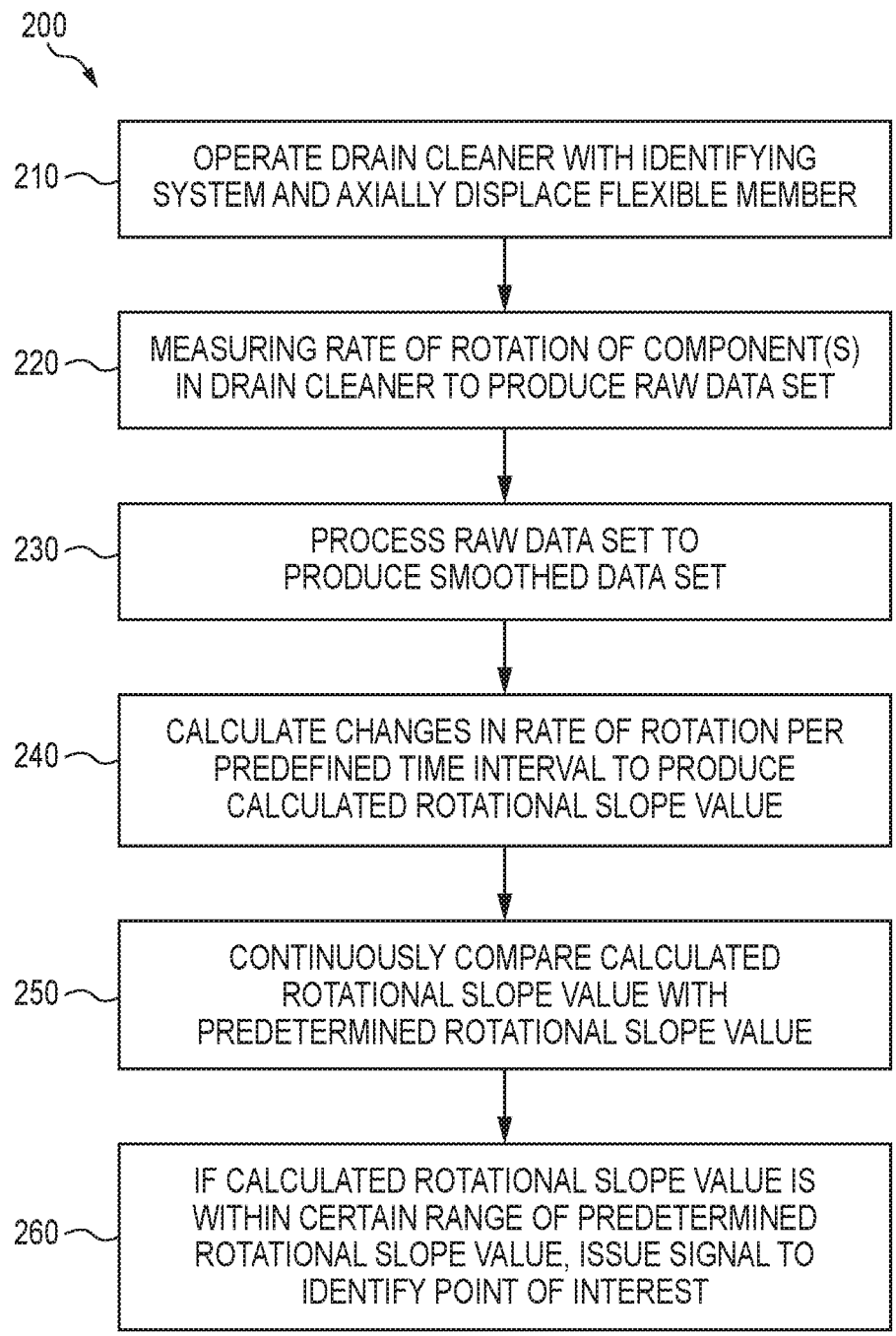
FIG. 5 is a schematic flowchart illustrating an embodiment of a method for identifying a point of interest in accordance with the present subject matter.

Specifically, and with reference to FIG. 5, a method for identifying a point of interest in an enclosed region, can be performed as follows. A drain cleaner is provided which includes an elongated flexible member, a rotatable motor output, a rotatable cable follower, a first pickup on the motor output, a first sensor affixed to a stationary component of the drain cleaner and in operable communication with the first pickup, a second pickup disposed on the cable follower, and a second sensor affixed to a stationary component of the drain cleaner and in operable communication with the second pickup. The method comprises operating the drain cleaner and axially displacing the flexible member relative to the drain cleaner such that the cable follower rotates. This is shown as operation 210 in FIG. 5. The method additionally comprises measuring at least one of a first rate of rotation and a second rate of rotation. This is shown as operation 220. For certain applications, measuring, and/or assessing the second rate of rotation may not be required for identifying the raw data for the point of interest. The first rate of rotation is determined by measuring a rate of rotation of the motor output via the first pickup and the first sensor.

And the second rate of rotation is determined by measuring a rate of rotation of the cable follower via the second pickup and the second sensor. As previously noted, in certain applications the second rate of rotation may not be required. Such measurements produce a raw data set. The raw data is typically collected and stored in a counter as previously described herein. The method also comprises processing the raw data set to produce a smoothed data set. This is shown as operation 230. The smoothed data set is typically calculated or collected in the controller as previously described. From the smoothed data set, the method then involves calculating changes in rate of rotation per a predefined time interval to produce a calculated rotational slope value. This is shown as operation 240. The method also comprises continuously comparing the calculated rotational slope value to a predetermined rotational slope value indicative of a point of interest. This is shown as operation 250. In certain embodiments, instead of smoothing the data through 3 second averaging for example, a point at 1 second intervals can be used to calculate linear regression over 2 seconds to generate the slope data. In a preferred embodiment, the predetermined rotational slope value is −2.5 revolutions per second. That value can range from −0.1 revolutions per second to −5 revolutions per second. However, it will be understood that the present subject matter includes the use of other predetermined slope values. Upon the calculated rotational slope value being within a predefined range of a first predetermined rotational slope value to a second predetermined rotational slope value, issuing a location marker signal to thereby identify a point of interest in the enclosed region. This is shown as operation 260. It is also contemplated that machine learning could be used to further refine the slope value based on user inputs of the obstruction or point of interest. The resultant would be application-based programming that uses multiple user interfaces that match points of interest by key words and begins building a case for identification of a specific point of interest. Additional details of these operations are as follows.

In operation 230, the raw data can be processed as described herein in which periodic RPM data taken at predetermined time intervals $T_1$ are averaged over a time interval $T_2$ to generate the smoothed data. Typically, $T_1$ may range from about 0.25 seconds to about 10 seconds and $T_2$ may range from about 1 second to about 10 seconds. In particular embodiments, $T_2$ is 3 seconds. However, it will be understood that the present subject matter is not limited to any of these aspects and includes time intervals less than and/or greater than these representative values. In addition, it will be understood that the present subject matter is not limited to any particular data smoothing technique.

In operation 240, a calculated rotational slope value can be determined by identifying two rate of rotation values over a predefined time interval $T_4$ and determining a difference or delta Δ between those values. The rotational slope value is then calculated by dividing the difference by the predefined time interval. Other techniques can be used for operation 240 such as interpolating a slope line based on two or more rate of rotation values over the predefined time interval. $T_4$ may range from about 2 seconds to about 20 seconds. However, it will be appreciated that the present subject matter is not limited to any of these representative time intervals.

In operation 250, the calculated rotational slope value $S_c$ is compared to one or more predetermined rotational slope value(s) $S_p$. If the $S_c$ is sufficiently close to $S_p$, a signal such as a location marker signal is issued to thereby identify a point of interest in the enclosed region.

The present subject matter also includes analyzing the calculated slope values $S_c$ further to identify P-traps, 90 degree bends, soft blockages, hard blockages, or other specific types of points of interest. That is, it is contemplated that particular types of points of interest can be identified by evaluating the slope values or characteristics of the slope values. For example a 90 degree bend in an enclosed region, i.e., a type of point of interest, may be reflected by a particular data set, i.e., a collection of rate of rotation values over a certain time interval. And, that data set is in many instances distinguishable from a data set associated with a different type of point of interest such as a soft blockage. Thus, a particular type of point of interest can be determined by review of its corresponding data set.

Figure 6:
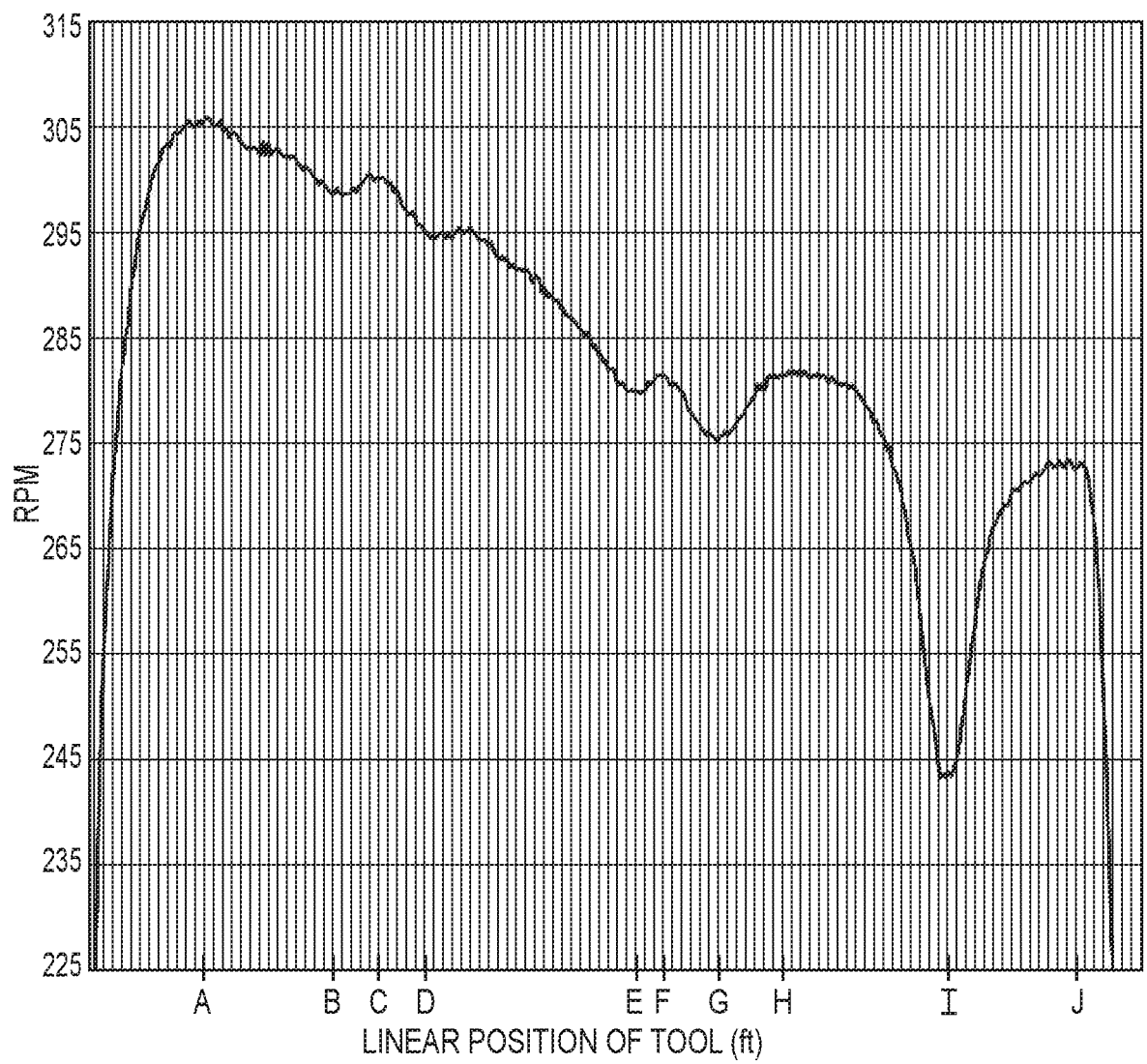
FIG. 6 is a representative graph generated from an identifying system showing cable travel as a tool and cable progress through a typical drain line with bends.

FIG. 6 is a representative graph generated from an identifying system such as previously described system 1 showing cable travel or linear position of a cable end or tool within an enclosed region as the cable and tool progress through a typical drain line having a collection of bends. Abrupt changes in RPM indicate potential point(s) of interest in the drain line. For example in the graph of FIG. 6, potential points of interest appear to be located at reference locations A-J.

Figure 7:
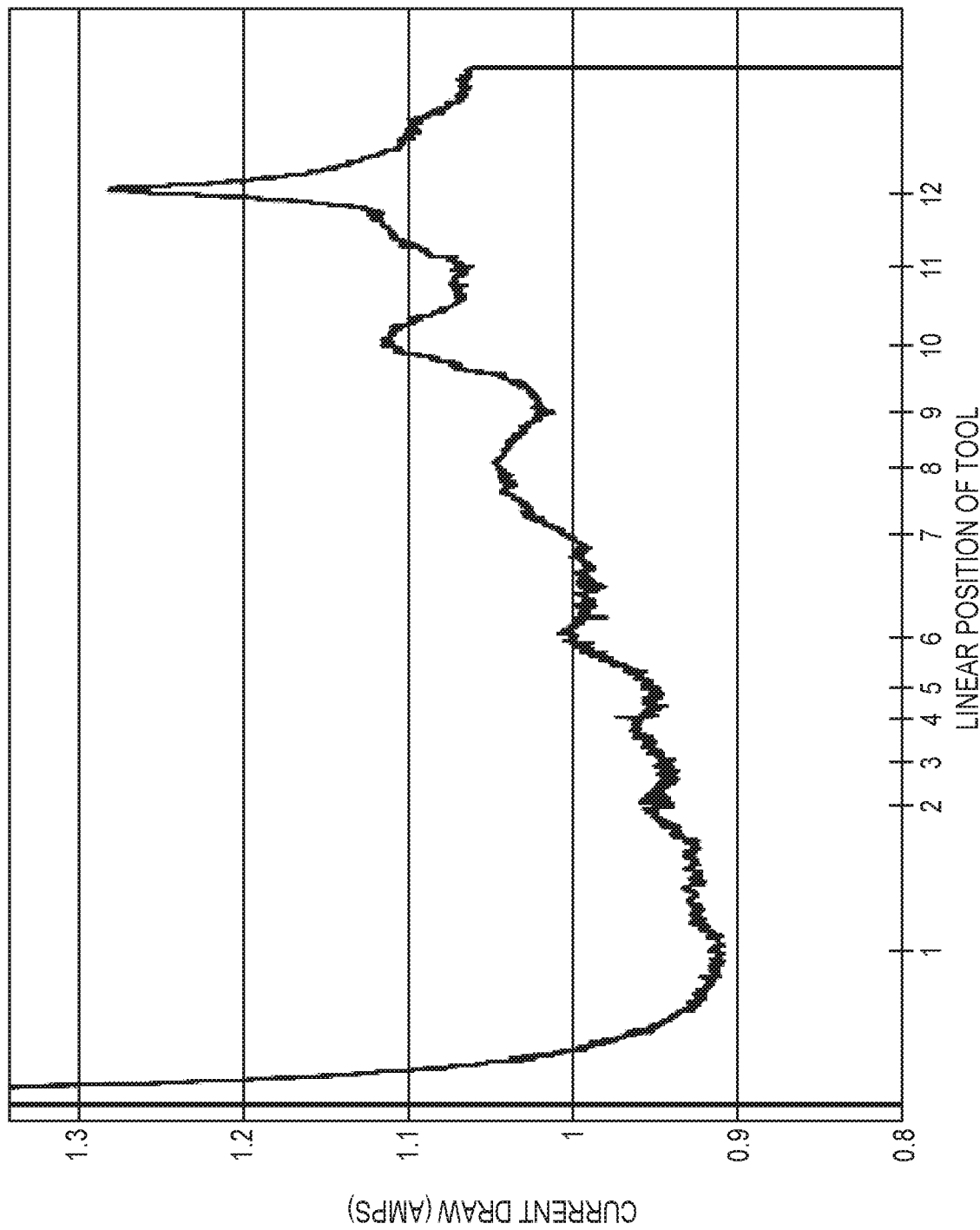
FIG. 7 is a representative graph generated from an identifying system showing electrical current draw of a motor in a drain cleaning machine as a tool and cable progress through a typical drain line with bends.

As previously noted, monitoring current draw of an electronic motor of a drain cleaner during a drain cleaning operation can also indicate point(s) of interest in an enclosed region. FIG. 7 is a representative graph generated from an identifying system showing electrical current draw of a motor in a drain cleaner as a tool and cable progress through a typical drain line with bends. Referring to FIG. 7, potential points of interest appear to be located at sharp current changes or increases at reference locations 1-12.

Typical operation of a drain cleaning machine having the identifying system and a connected device is as follows. Upon powering and activation of the drain cleaner, an onboard counter can receive RPM data from the sensor assemblies. Upon rotation of the drum, the machine reaches its stability point, typically within several seconds. A user then begins dispensing or advancing cable from the drain cleaner. All RPM data is collected by the counter. In certain embodiments of the system, collection of RPM data by the counter may be delayed or ignored and automatically initiated until a predetermined length of cable has been dispensed, for example 3 to 5 feet. This feature enables the user to avoid activating the system and also avoids collecting data prior to the machine reaching its stability point. However, it will be understood that the present subject matter is not limited to this strategy.

After reaching the stability point, and after a portion of the cable has been advanced from the machine into an enclosed region, the operator continues such cable advancement until flow has been established through the enclosed region and/or it has been determined that all blockage(s) or impediment(s) have been cleared. Throughout this process, RPM data has been collected and stored in the counter.

The operator then retrieves or withdraws the cable from the enclosed region and after the cable is returned to the drain cleaner, the operator actuates an end of cleaning button or control. Such actuation is typically performed at the drain cleaning machine.

The operator or another individual then connects a device such as a mobile device or smart phone with the drain cleaner. As previously noted, such connection provides communication and data exchange or transmission. Such connection is typically wireless, but the present subject matter includes wired or hard connections. The connected device could be in contact with the drain cleaner during use, and not only after completion of the job. However, in many embodiments, data can only be transferred after the completion of a job.

Upon connection with the device, the raw RPM data is transmitted to the device for processing. As previously noted, the raw data can be smoothed. Typically, such data smoothing is performed by the device. The smoothed or processed data is then evaluated to identify one or more point(s) of interest in the enclosed region. As previously described, such evaluation typically involves comparing a calculated rotational slope value to one or more predetermined rotational slope value(s).

In certain versions of the present subject matter, the device may include provisions to generate maps or graphical illustrations representative of the enclosed region, and the points of interest can be denoted on the maps or illustrations. The points of interest can also be shown on a variety of graphs or other presentation formats.

In addition, the device can transmit any of the raw data, processed or smoothed data, predetermined slope values, calculated slope values, location marker signals, and/or other information regarding point(s) of interest to a supervisory computer or workstation.

In a particular embodiment, the data collected from the machine is taken as raw data points of RPM every ⅓ of a second. This data set is stored along with distance marker information corresponding to each RPM and indication if the motor is activated or not. Threshold values of running are also included into the data acquisition unit. These thresholds inform the acquisition unit whether or not to record points. This data set also includes a header which identifies the cable diameter and length to provide details about the job to the application user. The data set is stored in its raw format until it is uploaded via BLE (or other wireless connection) to a device capable of using the application. Within the application, the data set is filtered by predetermined average (not necessarily 50-50) between two or more points to provide a graphical representation line graph of the RPM values.

Figure 8:
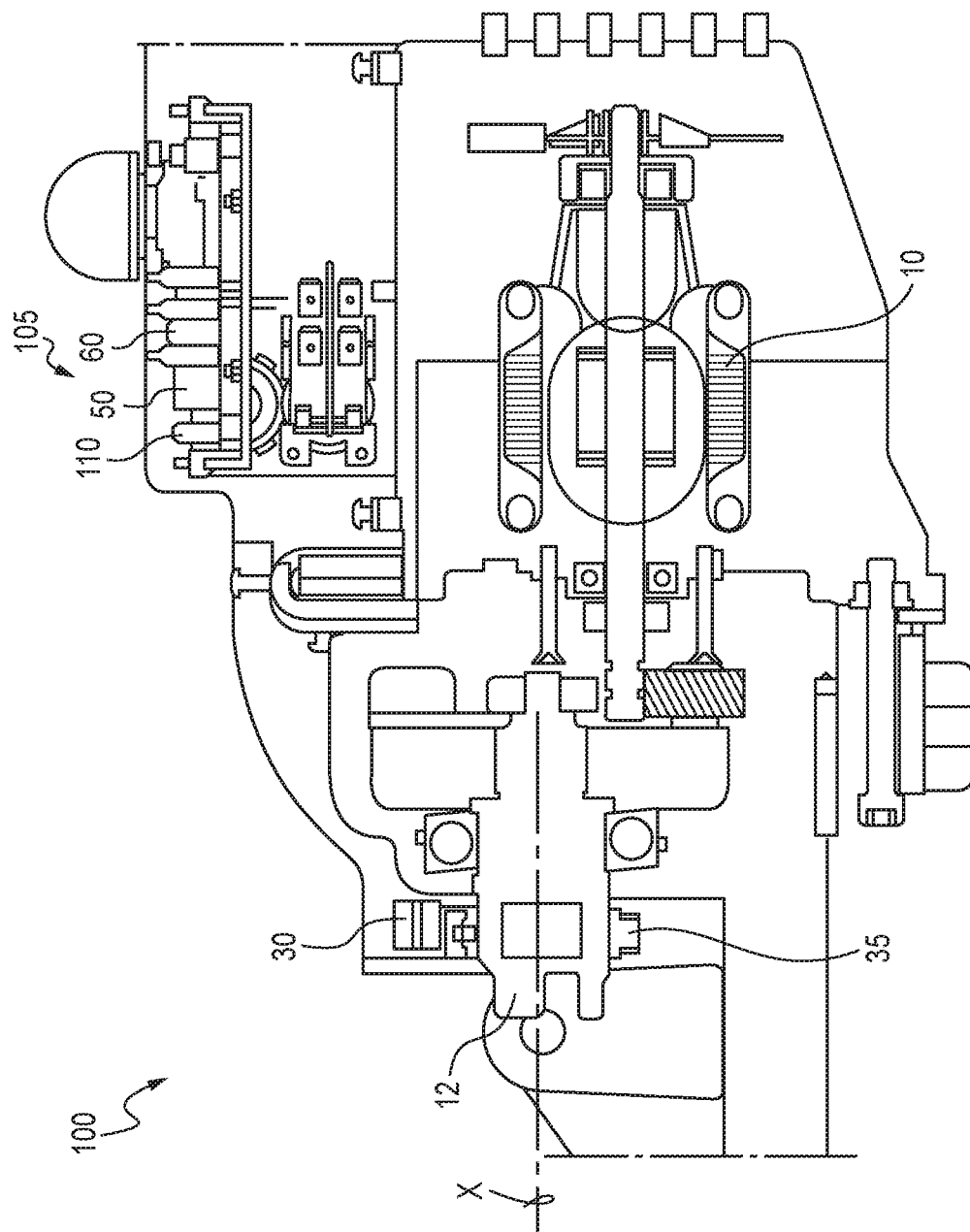
FIG. 8 is a schematic cross sectional view of a drain cleaning machine including a data acquisition unit in accordance with an embodiment of the present subject matter.

FIG. 8 schematically illustrates a partial cross section of a drain cleaning machine 100 having a motor 10 that rotatably drives or powers a rotatable output 12. FIG. 8 illustrates a first sensor assembly having a first pickup 35 disposed on or engaged with the output 12, and a first sensor 30 secured or mounted to a stationary component of the drain cleaner 100. The first sensor 30 is in operable communication with the first pickup 35. Upon activation of the motor 10, the output 12 rotates about axis of rotation X. As will be understood, upon rotation of the output 12, the pickup 35 passes alongside the stationary sensor 30. The drain cleaner 10 also comprises electronics 105 that may include one or more of a data acquisition unit 110, a counter 50, a controller 60, and additional components and/or provisions.

Figure 9:
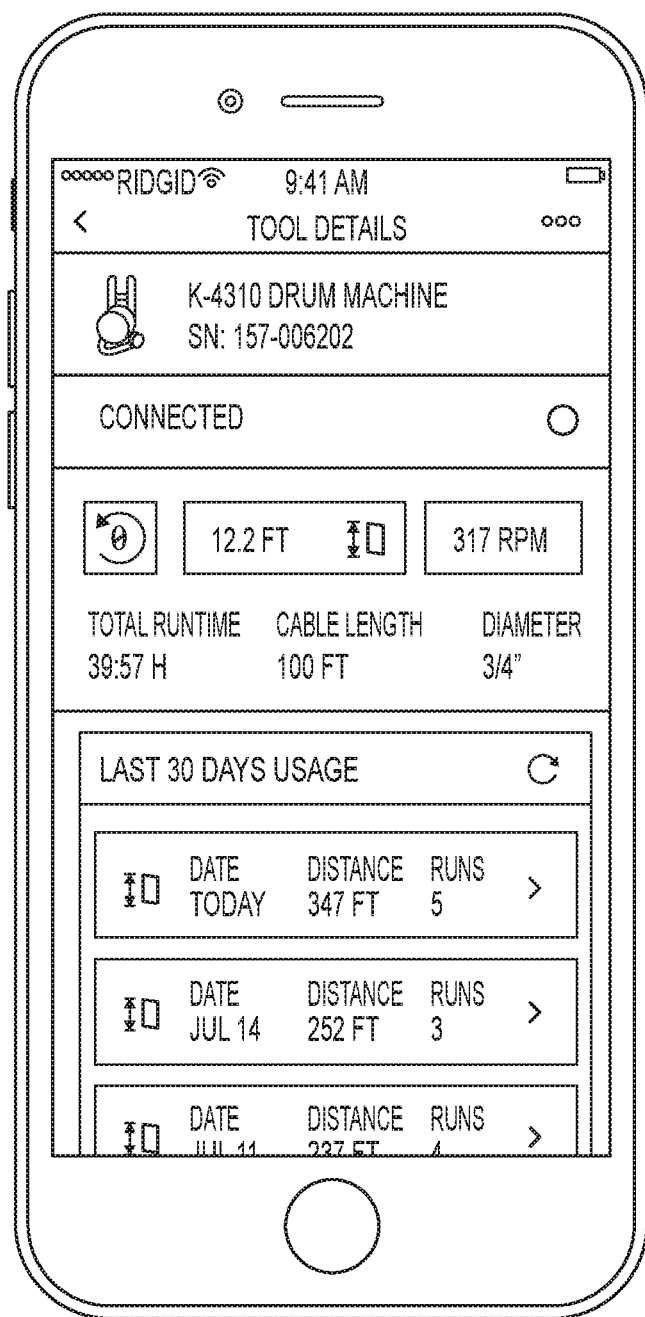
FIGS. 9 to 11 are representative screen displays of a mobile device presenting information from the identifying system in accordance with an embodiment of the present subject matter.
Figure 10:
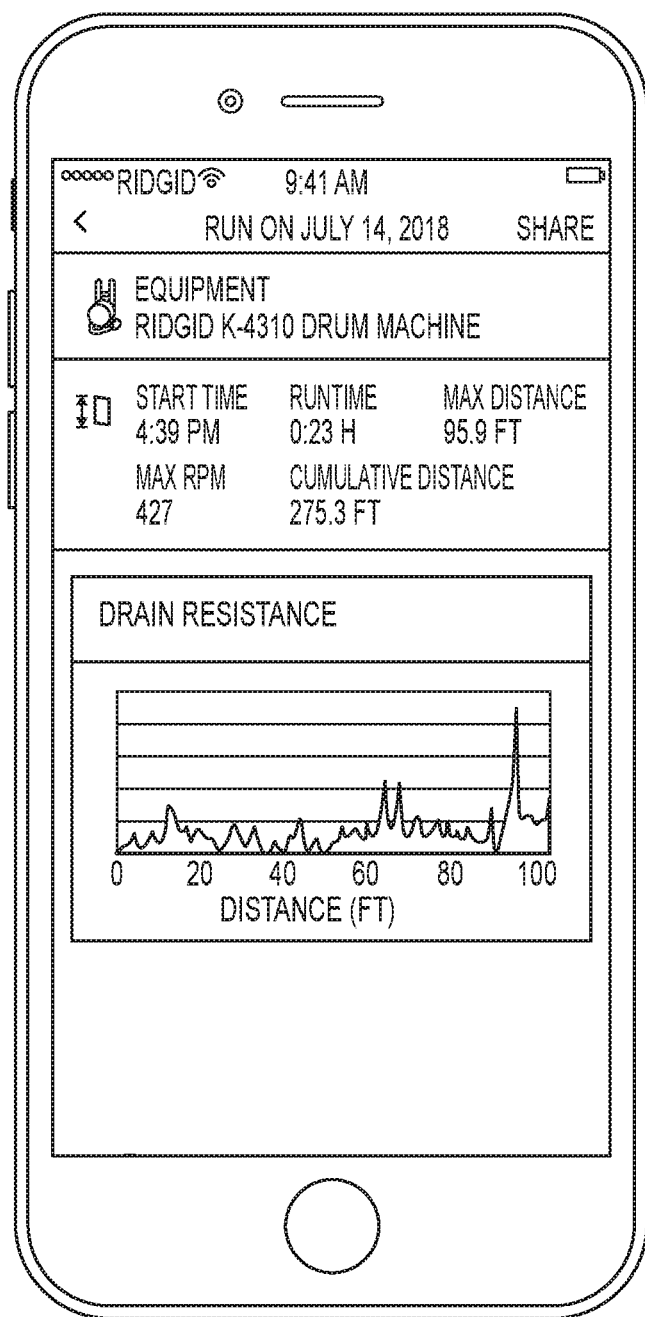
Figure 11:
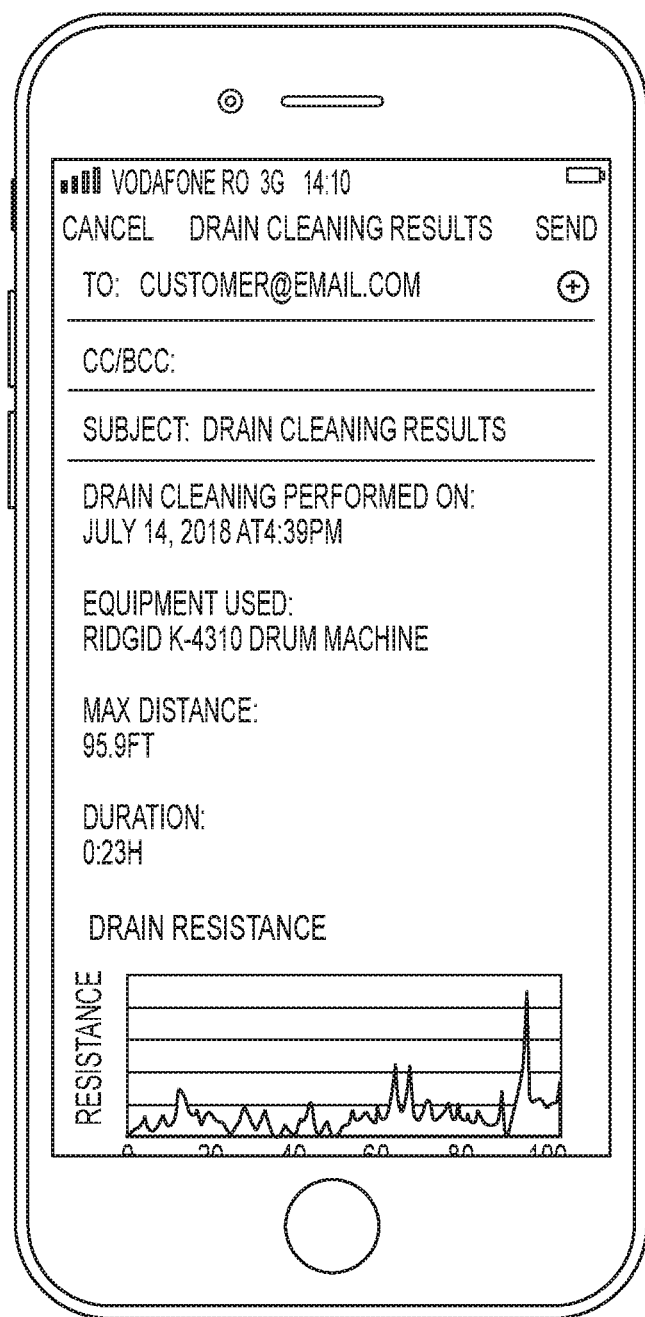

FIGS. 9-11 illustrate a representative mobile device 95 of the identifying system as described herein. FIG. 9 illustrates typical job records presented on the mobile device 95. FIG. 10 illustrates typical key details presented on the mobile device 95. And FIG. 11 illustrates typical archival of information for review by a subsequent user or at a later time, on the mobile device 95.

In one aspect, the present subject matter provides an identifying system for use with a drain cleaner having an elongated flexible member, a rotatable motor output, and a rotatable cable follower. The identifying system is for identifying a point of interest in an enclosed region. The system comprises a first sensor assembly including a first pickup disposed on the motor output, and a first sensor affixed to a stationary component of the drain cleaner and in operable communication with the first pickup. The system also comprises a second sensor assembly including a second pickup disposed on the cable follower, and a second sensor affixed to a stationary component of the drain cleaner and in operable communication with the second pickup. The system additionally comprises a counter configured to determine a linear amount of the elongated flexible member dispensed from the drain cleaner. And, the system also comprises a controller configured to determine occurrence of a distal end of the elongated flexible member encountering a point of interest in an enclosed region.

In another aspect, the present subject matter provides a method for identifying a point of interest in an enclosed region. The method comprises providing a drain cleaner having an elongated flexible member, a rotatable motor output, a rotatable cable follower, a first pickup on the motor output, a first sensor affixed to a stationary component of the drain cleaner and in operable communication with the first pickup, a second pickup disposed on the cable follower, and a second sensor affixed to a stationary component of the drain cleaner and in operable communication with the second pickup. The method also comprises operating the drain cleaner and axially displacing the flexible member relative to the drain cleaner such that the cable follower rotates. The method additionally comprises measuring a first rate of rotation wherein the first rate of rotation is determined by measuring a rate of rotation of the motor output via the first pickup and the first sensor to produce a raw data set. The method further comprises processing the raw data set to produce a smoothed data set. From the smoothed data set, the method also comprises calculating changes in rate of rotation per a predefined time interval to produce a calculated rotational slope value. The method additionally comprises continuously comparing the calculated rotational slope value to a predetermined rotational slope value indicative of a point of interest. Upon the calculated rotational slope value being within a predefined range of a first predetermined rotational slope value to a second predetermined rotational slope value, the method issues a location marker signal to thereby identify a point of interest in the enclosed region.

In yet another aspect, the present subject matter also provides a drain cleaner comprising a frame assembly, and a motor having a rotatable motor output, the motor supported by the frame assembly. The drain cleaner also comprises a rotatable drum supported by the frame assembly. The drum at least partially houses an elongated flexible member. The drain cleaner also comprises a rotatable cable follower that rotates upon linear displacement of the flexible member. The drain cleaner also comprises a first sensor assembly including a first pickup disposed on the motor output, and a first sensor affixed to a stationary component of the drain cleaner and in operable communication with the first pickup. The drain cleaner additionally comprises a second sensor assembly including a second pickup disposed on the cable follower, and a second sensor affixed to a stationary component of the drain cleaner and in operable communication with the second pickup. The drain cleaner also comprises a counter configured to determine a linear amount of the elongated flexible member dispensed from the drain cleaner.

ADDITIONAL ASPECTS

In accordance with the present subject matter, in certain applications the various devices and systems described herein preferably utilize a brushless DC electric motor. Preferably, the electric motor is a brushless direct current (DC) electric motor, sometimes referred to in the art as a BLDC motor. A brushless DC (BLDC) motor is a synchronous electric motor powered by direct current (DC) electricity using an electronic commutation system, rather than a mechanical commutator and brushes.

Two types of BLDC motors exist. A stepper or servo motor type may have multiple poles on the rotor, which is generally in the form of a fixed permanent magnet. This type is referred to herein as a permanent magnet brushless DC electric motor. The second type of BLDC motor is a reluctance motor. This second type may not have permanent magnets, but instead use salient poles that are pulled into alignment by a timed drive. This type is referred to herein as a switched reluctance brushless DC electric motor.

In a BLDC motor, the electromagnets do not move. Instead, the rotor or permanent magnets rotate and the stator remains static. This overcomes the challenge of how to transfer current to a moving electromagnet. In order to turn the rotor, the brush-system/commutator assembly of a conventional motor is replaced by an electronic controller. The controller performs a timed power distribution similar to that found in a brushed DC motor, but uses a solid-state circuit rather than a commutator/brush system.

BLDC motors offer several advantages over conventional brushed DC motors, including higher efficiency and reliability, reduced noise, longer lifetime (no brush and commutator wear), elimination of ionizing sparks from the commutator, more power, and overall reduction of electromagnetic interference (EMI). With no windings on the rotor, BLDC motors are subjected to less centripetal forces, and because the windings are supported by the housing, they can be cooled by conduction, requiring no airflow inside the motor for cooling. This in turn means that internal components of the motor can be entirely enclosed and protected from dirt or other foreign matter. Additionally, BLDC motors exhibit reduced size and weight as compared to equivalent brushed motors. This translates to higher power to weight ratios over equivalent brushed motors. Moreover, BLDC motors are also typically slower at the same horsepower as equivalent brushed motors. Thus, BLDC motors exhibit higher power to RPM ratios as compared to brushed motors. Depending upon the configuration and implementation of the BLDC motor, it may be possible to eliminate one or more drive gears otherwise necessary to achieve certain rates of powered rotation of a drive output.

The maximum power that can be applied to a BLDC motor is exceptionally high, limited almost exclusively by heat. As will be appreciated, heat can weaken the magnets. Certain magnets typically demagnetize at temperatures greater than 100° C.

In addition, BLDC motors are often more efficient in converting electricity into mechanical power than brushed DC motors. This improvement is largely due to the absence of electrical and frictional losses due to brushes. The enhanced efficiency is greatest in the no-load and low-load region of the motor's performance curve. Under high mechanical loads, BLDC motors and high-quality brushed motors are comparable in efficiency. Increased efficiency of BLDC motors is also due at least in part to increases in pole count. Generally, increasing the number of poles causes a reduced step angle, thereby resulting in a reduced distance between magnets. Thus, in comparing a BLDC motor to a similarly sized brushed motor, the BLDC motor operates with greater efficiency.

A particularly preferred type of stator configuration used in a BLDC motor is one utilizing a segmented lamination technology. A motor using this technology features significantly reduced end turns in comparison to a traditional brushless motor, and results in increased thermal efficiency. Details as to segmented lamination stator technology are provided in an article by R. Welch, "Think Thermal to Increase Motor Efficiency," *Motion System Design*, p. 32-33, August 2009. Stators exhibiting this configuration are referred to herein as a "segmented tooth stator."

Although particular preferred embodiments described herein utilize a brushless motor, it will be understood that in certain versions of the present subject matter a conventional electric motor and one using brushes may be employed. That is, the subject matter includes drain cleaning devices and/or inspection systems having the noted sensors and control provisions used in conjunction with a brushed electric motor.

A preferred embodiment drain cleaning device includes one or more of the following features.

A. Energy Efficiency

As far as is known, previous drain cleaning devices were relatively inefficient in terms of power consumption. The present subject matter drain cleaning device provides significantly increased levels of operating efficiency and productivity gains as compared to previous devices. Moreover, the preferred embodiment system and/or device may be operated at relatively high efficiency levels due at least in part to operational gains from the use of certain motors, and user selected controls. BLDC motors offer several advantages over conventional brushed DC motors, including higher efficiency. In addition, BLDC motors are often more efficient in converting electricity into mechanical power than brushed DC motors. This improvement is largely due to the absence of electrical and frictional losses due to brushes. The enhanced efficiency is greatest in the no-load and low-load region of the motor's performance curve. Under high mechanical loads, BLDC motors and high quality brushed motors are comparable in efficiency. Increased efficiency of BLDC motors is also due at least in part to increases in pole count. Generally, increasing the number of poles causes a reduced step angle, thereby resulting in a reduced distance between magnets. Thus, in comparing a BLDC motor to a similarly sized brushed motor, the BLDC motor operates with greater efficiency.

A particularly preferred type of stator configuration used in a BLDC motor is one utilizing a segmented lamination technology. A motor using this technology features significantly reduced end turns in comparison to a traditional brushless motor, and results in increased thermal efficiency. Details as to segmented lamination stator technology are provided in an article by R. Welch, "Think Thermal to Increase Motor Efficiency," *Motion System Design*, p. 32-33, August 2009. Stators exhibiting this configuration are referred to herein as a "segmented tooth stator."

B. Productivity

Previously known drain cleaning devices were limited in the extent of control features provided for such devices. As a result, relatively low productivity levels were associated with previously known devices.

As explained herein, by providing specific control of drain cleaning and/or inspection operations using information obtained by associated sensors, the preferred embodiment device provides improvements in productivity.

As explained herein, a preferred embodiment drain cleaning device includes various features that enable improved operator control over the device and its components. For example, multiple modes of operation are provided whereby a drain cleaning and/or inspection operation can be performed in which one or more parameters relating to electrical current consumption, cycle counting, and sensor feedback are utilized to control the operation of the device.

Furthermore, as described herein, the preferred embodiment drain cleaning device comprises a BLDC motor. BLDC motors offer several advantages over conventional brushed DC motors, including for example greater levels of power. The maximum power that can be applied to a BLDC motor is exceptionally high, limited almost exclusively by heat.

Based on several factors, the productivity gains associated with BLDC motors in the preferred version under discussion are not primarily related to sensors and controls as for other preferred embodiments described herein.

For certain motor configurations, the most efficient mode of operation is to operate the BLDC motor at the maximum power.

The preferred embodiment system and/or device comprises a control system governing operation of the BLDC motor. In one particularly preferred aspect, the control system includes a power factor correction (PFC) function or unit. The power factor correction (PFC) function of the control system actively boosts the voltage to the PWM driver PCB. As torque increases, the voltage to the motor is maintained at a higher level compared to a rectifier configuration. The greater voltage results in a greater motor RPM. Thus, the cycle time for an equivalent operation is reduced.

C. Durability

As will be appreciated, it would be desirable to provide a drain cleaning device that exhibits a high level of durability. The preferred embodiment system and/or drain cleaning device also exhibits greater durability as compared to previous devices.

The improved durability is believed to result from one or more of the following features: With no windings on the rotor, BLDC motors are subjected to less centripetal force. Improved durability also results from avoiding the use of brushes in the motor.

Additionally, previously known drain cleaning devices exhibited relatively low durability as a result of the use of components susceptible to wear, for example brushes in the motor.

BLDC motors offer several advantages over conventional brushed DC motors, including higher efficiency and reliability, and longer lifetime as a result of no brush and commutator wear.

Improved durability may also result from a reduced operating speed (RPM) and/or gear stages as a result of utilizing a BLDC motor.

Moreover, BLDC motors also typically operate slower at the same horsepower as equivalent brushed motors. Thus, BLDC motors exhibit higher power to RPM ratios as compared to brushed motors. Depending upon the configuration and implementation of the BLDC motor, it may be possible to eliminate one or more drive gears otherwise necessary to achieve certain rates of powered rotation of a drive output.

Improved durability also results from enclosing the motor. Specifically, yet another advantage associated with the preferred embodiment system and/or device relates to durability improvements as a result of eliminating entry of external agents into the motor environment. For example, because the windings in a BLDC motor are supported by the housing, they can be cooled by conduction, thereby not requiring airflow inside the motor for cooling. This in turn means that internal components of the motor can be entirely enclosed and protected from dirt or other foreign matter. This is particularly a concern for drain cleaning machines because dirt, water, and foreign agents are typically produced from the operation of the device.

However, it will be understood that an internal fan or cooling assembly can be included in association with the BLDC motor when utilized in the preferred embodiment devices. Optionally and preferably, an external motor fan can be used provided to direct air past the various motor components and provide additional cooling thereof.

Improved durability also results from no carbon dust generated by brushes, as the motor is a brushless motor. Carbon particles are dispersed through the machine and can contaminate other regions and surfaces of the drain cleaning device.

Improved durability also results from significant reduction in ozone generation. BLDC motors offer several advantages over conventional brushed DC motors, including elimination of ionizing sparks from the commutator.

Improved durability also results from reductions in electrical noise. BLDC motors offer several advantages over conventional brushed DC motors, including reduction of electromagnetic interference (EMI). Reductions in electrical noise may also result from directing incoming electrical current to a rectifier and power factor correction device.

D. Noise Reduction

BLDC motors offer several advantages over conventional brushed DC motors, including reduced acoustic noise. As will be appreciated, exposure for prolonged time periods to high levels of acoustic noise can be detrimental. BLDC motors typically exhibit lower sound levels during operation over comparable brushed motors.

In certain embodiments, the drain cleaner utilizes an identifying system that comprises a first sensor assembly providing information concerning rate of rotation of a motor output. In certain versions, the first sensor assembly is incorporated or otherwise provided by a BLDC motor. The first sensor assembly may include at least one hall sensor and may be incorporated in the BLDC motor. These aspects are utilized in combination with the second sensor assembly as described herein. These sensor assemblies are further used with the counter and the controller components as described herein.

The present subject matter also provides drain cleaning devices and/or inspection systems that comprise the noted identifying systems.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An identifying system for use with a drain cleaner having an elongated flexible member, a rotatable motor output, and a rotatable cable follower, the identifying system for identifying a point of interest in an enclosed region and comprising:
a first sensor assembly including a first pickup associated with the motor output, and a first sensor affixed to a stationary component of the drain cleaner and in operable communication with the first pickup;
a second sensor assembly including a second pickup disposed on the cable follower, and a second sensor affixed to a stationary component of the drain cleaner and in operable communication with the second pickup;
a counter configured to determine a linear amount of the elongated flexible member dispensed from the drain cleaner; and
a controller configured to determine occurrence of a distal end of the elongated flexible member encountering a point of interest in an enclosed region.

2. The identifying system of claim 1 further comprising:
a current sensor configured to determine electrical current draw of the motor of the drain cleaner.

3. The identifying system of claim 1 wherein the first sensor is a multi-sensor, back biased hall sensor.

4. The identifying system of claim 1 wherein the second sensor is a multi-sensor, back biased hall sensor.

5. The identifying system of claim 1 wherein the first sensor of the first sensor assembly is a first primary hall sensor, the first sensor assembly further including a first secondary hall sensor affixed to a stationary component of the drain cleaner and in operable communication with the first pickup.

6. The identifying system of claim 5 wherein each of the first primary hall sensor and the first secondary hall sensor is a single-sensor, back biased hall sensor.

7. The identifying system of claim 1 wherein the second sensor of the second sensor assembly is a second primary hall sensor, the second sensor assembly further including a second secondary hall sensor affixed to a stationary component of the drain cleaner and in operable communication with the second pickup.

8. The identifying system of claim 7 wherein each of the second primary hall sensor and the second secondary hall sensor is a single-sensor, back biased hall sensor.

9. The identifying system of claim 1 wherein at least one of the first pickup and the second pickup is in the form of a circular ring having a plurality of radially extending projections.

10. The identifying system of claim 1 wherein the at least one of the first pickup and the second pickup includes a ferrous material.

11. The identifying system of claim 1 further comprising a mobile device.

12. A drain cleaner comprising:
a frame assembly;
a motor having a rotatable motor output, the motor supported by the frame assembly;
a rotatable drum supported by the frame assembly, the drum at least partially housing an elongated flexible member;
a rotatable cable follower that rotates upon linear displacement of the flexible member;
a first sensor assembly including a first pickup associated with the motor output, and a first sensor affixed to a stationary component of the drain cleaner and in operable communication with the first pickup;
a second sensor assembly including a second pickup disposed on the cable follower, and a second sensor affixed to a stationary component of the drain cleaner and in operable communication with the second pickup; and
a counter configured to determine a linear amount of the elongated flexible member dispensed from the drain cleaner.

13. The drain cleaner of claim 12 further comprising:
a current sensor configured to determine electrical current draw of the motor of the drain cleaner.

14. The drain cleaner of claim 12 wherein the first sensor is a multi-sensor, back biased hall sensor.

15. The drain cleaner of claim 12 wherein the second sensor is a multi-sensor, back biased hall sensor.

16. The drain cleaner of claim 12 wherein the first sensor of the first sensor assembly is a first primary hall sensor, the first sensor assembly further including a first secondary hall sensor affixed to a stationary component of the drain cleaner and in operable communication with the first pickup.

17. The drain cleaner of claim 16 wherein each of the first primary hall sensor and the first secondary hall sensor is a single-sensor, back biased hall sensor.

18. The drain cleaner of claim 12 wherein the second sensor of the second sensor assembly is a second primary hall sensor, the second sensor assembly further including a second secondary hall sensor affixed to a stationary component of the drain cleaner and in operable communication with the second pickup.

19. The drain cleaner of claim 18 wherein each of the second primary hall sensor and the second secondary hall sensor is a single-sensor, back biased hall sensor.

20. The drain cleaner of claim 12 wherein at least one of the first pickup and the second pickup is in the form of a circular ring having a plurality of radially extending projections.

21. The drain cleaner of claim 12 further comprising:
a controller configured to determine occurrence of a distal end of the elongated flexible member encountering a point of interest in an enclosed region.

22. The drain cleaner of claim 12 wherein the motor is a BLDC motor.

23. An identifying system for use with a drain cleaner having an elongated flexible member, a rotatable motor output, and a rotatable cable follower, the identifying system for identifying a point of interest in an enclosed region and comprising:
a first sensor assembly including a first pickup disposed on the motor output, and a first sensor affixed to a stationary component of the drain cleaner and in operable communication with the first pickup, wherein the motor output is one or more of a rotatable drive shaft of a motor and/or one or more rotatable components powered or driven by the motor;
a second sensor assembly including a second pickup disposed on the cable follower, and a second sensor affixed to a stationary component of the drain cleaner and in operable communication with the second pickup;
a counter configured to determine a linear amount of the elongated flexible member dispensed from the drain cleaner; and
a controller configured to determine occurrence of a distal end of the elongated flexible member encountering a point of interest in an enclosed region.

24. The identifying system of claim 23 further comprising:
a current sensor configured to determine electrical current draw of the motor of the drain cleaner.

25. The identifying system of claim 23 wherein the first sensor is a multi-sensor, back biased hall sensor.

26. The identifying system of claim 23 wherein the second sensor is a multi-sensor, back biased hall sensor.

27. The identifying system of claim 23 wherein the first sensor of the first sensor assembly is a first primary hall sensor, the first sensor assembly further including a first secondary hall sensor affixed to a stationary component of the drain cleaner and in operable communication with the first pickup.

28. The identifying system of claim 27 wherein each of the first primary hall sensor and the first secondary hall sensor is a single-sensor, back biased hall sensor.

29. The identifying system of claim 23 wherein the second sensor of the second sensor assembly is a second primary hall sensor, the second sensor assembly further including a second secondary hall sensor affixed to a stationary component of the drain cleaner and in operable communication with the second pickup.

30. The identifying system of claim 29 wherein each of the second primary hall sensor and the second secondary hall sensor is a single-sensor, back biased hall sensor.

31. The identifying system of claim 23 wherein at least one of the first pickup and the second pickup is in the form of a circular ring having a plurality of radially extending projections.

32. The identifying system of claim 23 wherein the at least one of the first pickup and the second pickup includes a ferrous material.

33. The identifying system of claim 23 further comprising a mobile device.

34. A drain cleaner comprising:
a frame assembly;
a motor having a rotatable motor output, the motor supported by the frame assembly;
a rotatable drum supported by the frame assembly, the drum at least partially housing an elongated flexible member;
a rotatable cable follower that rotates upon linear displacement of the flexible member;
a first sensor assembly including a first pickup disposed on the motor output, and a first sensor affixed to a stationary component of the drain cleaner and in operable communication with the first pickup, wherein the motor output is one or more of a rotatable drive shaft of a motor and/or one or more rotatable components powered or driven by the motor;
a second sensor assembly including a second pickup disposed on the cable follower, and a second sensor affixed to a stationary component of the drain cleaner and in operable communication with the second pickup; and
a counter configured to determine a linear amount of the elongated flexible member dispensed from the drain cleaner.

35. The drain cleaner of claim 34 further comprising:
a current sensor configured to determine electrical current draw of the motor of the drain cleaner.

36. The drain cleaner of claim 34 wherein the first sensor is a multi-sensor, back biased hall sensor.

37. The drain cleaner of claim 34 wherein the second sensor is a multi-sensor, back biased hall sensor.

38. The drain cleaner of claim 34 wherein the first sensor of the first sensor assembly is a first primary hall sensor, the first sensor assembly further including a first secondary hall sensor affixed to a stationary component of the drain cleaner and in operable communication with the first pickup.

39. The drain cleaner of claim 38 wherein each of the first primary hall sensor and the first secondary hall sensor is a single-sensor, back biased hall sensor.

40. The drain cleaner of claim 34 wherein the second sensor of the second sensor assembly is a second primary hall sensor, the second sensor assembly further including a second secondary hall sensor affixed to a stationary component of the drain cleaner and in operable communication with the second pickup.

41. The drain cleaner of claim 40 wherein each of the second primary hall sensor and the second secondary hall sensor is a single-sensor, back biased hall sensor.

42. The drain cleaner of claim 34 wherein at least one of the first pickup and the second pickup is in the form of a circular ring having a plurality of radially extending projections.

43. The drain cleaner of claim 34 further comprising:
a controller configured to determine occurrence of a distal end of the elongated flexible member encountering a point of interest in an enclosed region.

44. The drain cleaner of claim 34 wherein the motor is a BLDC motor.

45. An identifying system for use with a drain cleaner having an elongated flexible member, a rotatable motor output, and a rotatable cable follower, the identifying system for identifying a point of interest in an enclosed region and comprising:
a first sensor assembly providing a rate of rotation of the motor output;
a second sensor assembly including a pickup disposed on the cable follower, and a sensor affixed to a stationary component of the drain cleaner and in operable communication with the pickup;
a counter configured to determine a linear amount of the elongated flexible member dispensed from the drain cleaner; and
a controller configured to determine occurrence of a distal end of the elongated flexible member encountering a point of interest in an enclosed region.

46. The identifying system of claim 45 further comprising:
a current sensor configured to determine electrical current draw of the motor of the drain cleaner.

47. The identifying system of claim 45 wherein the first sensor assembly includes a hall sensor.

48. The identifying system of claim 47 wherein the hall sensor is a multi-sensor, back biased hall sensor.

49. The identifying system of claim 45 wherein the sensor of the second sensor assembly is a multi-sensor, back biased hall sensor.

50. The identifying system of claim 45 further comprising a mobile device.

51. A drain cleaner comprising:
a frame assembly;
a motor having a rotatable motor output, the motor supported by the frame assembly;
a rotatable drum supported by the frame assembly, the drum at least partially housing an elongated flexible member;
a rotatable cable follower that rotates upon linear displacement of the flexible member;

a first sensor assembly providing a rate of rotation of the motor output;

a second sensor assembly including a pickup disposed on the cable follower, and a sensor affixed to a stationary component of the drain cleaner and in operable communication with the pickup; and a counter configured to determine a linear amount of the elongated flexible member dispensed from the drain cleaner.

52. The drain cleaner of claim 51 further comprising:
a current sensor configured to determine electrical current draw of the motor of the drain cleaner.

53. The drain cleaner of claim 51 wherein the first sensor assembly includes a hall sensor.

54. The drain cleaner of claim 53 wherein the hall sensor is a multi-sensor, back biased hall sensor.

55. The drain cleaner of claim 51 wherein the sensor of the second sensor assembly is a multi-sensor, back biased hall sensor.

56. The drain cleaner of claim 51 further comprising:
a controller configured to determine occurrence of a distal end of the elongated flexible member encountering a point of interest in an enclosed region.

57. The drain cleaner of claim 51 wherein the motor is a BLDC motor.

* * * * *